United States Patent
Park et al.

(10) Patent No.: US 7,851,090 B2
(45) Date of Patent: Dec. 14, 2010

(54) ORGANIC ELECTROLYTIC SOLUTION AND LITHIUM BATTERY USING THE SAME

(75) Inventors: Jin-hwan Park, Seoul (KR); Seok-gwang Doo, Seoul (KR); Dong-min Im, Seoul (KR); Gue-sung Kim, Yongin-si (KR); Nina K. Gusarova, Irkutsk (RU); Boris A. Trofimov, Irkutsk (RU)

(73) Assignee: Samsung SDI Co., Ltd., Yongin-si (KR)

( * ) Notice: Subject to any disclaimer, the term of this patent is extended or adjusted under 35 U.S.C. 154(b) by 1149 days.

(21) Appl. No.: 11/508,629

(22) Filed: Aug. 22, 2006

(65) Prior Publication Data

US 2007/0048623 A1    Mar. 1, 2007

(30) Foreign Application Priority Data

Aug. 24, 2005    (KR) .................. 10-2005-0078037

(51) Int. Cl.
*H01M 10/52* (2006.01)
*H01M 10/56* (2006.01)
*H01M 10/567* (2006.01)

(52) U.S. Cl. ............ 429/313; 429/314; 429/326; 429/330; 429/332

(58) Field of Classification Search .......... None
See application file for complete search history.

(56) References Cited

U.S. PATENT DOCUMENTS

2005/0221195 A1*  10/2005  Uchida et al. ........... 429/313

FOREIGN PATENT DOCUMENTS

| | | |
|---|---|---|
| JP | 60-023973 | 2/1985 |
| JP | 61-227377 | 10/1986 |
| JP | 61-284070 | 12/1986 |
| JP | 04-184870 | 7/1992 |
| JP | 08-088023 | 4/1996 |
| JP | 2000-331710 | 11/2000 |
| JP | 2001-052965 | 2/2001 |
| JP | 2001-319685 | 11/2001 |
| WO | WO 97/44842 | 11/1997 |

OTHER PUBLICATIONS

Patent Abstracts of Japan for Publication No. 60-023973, Date of Publication of Application Feb. 6, 1985 in the name of Yoshimitsu et al.
Patent Abstracts of Japan for Publication No. 61-227377; Date of Publication of Application Oct. 9, 1986 in the name of Shishikura et al.

(Continued)

*Primary Examiner*—Dah-Wei D Yuan
*Assistant Examiner*—Edu E Enin-Okut
(74) *Attorney, Agent, or Firm*—Christie, Parker & Hale, LLP (57) ABSTRACT

An organic electrolytic solution is provided which includes a lithium salt, an organic solvent including a first solvent having high permittivity and a second solvent having a low boiling point, and a phosphine oxide compound The phosphine oxide compound imparts flame resistance and good charge/discharge properties, thereby producing a lithium battery that is highly stable and reliable and that has good charge/discharge efficiency.

15 Claims, 3 Drawing Sheets

OTHER PUBLICATIONS

Patent Abstracts of Japan for Publication No. 61-284070; Date of Publication of Application Dec. 15, 1986 in the Name of Shishikura et al.
Patent Abstracts of Japan for Publication No. 04-184870; Date of Publication of Application Jul. 1, 1992 in the name of Ue.
Patent Abstracts of Japan for Publication No. 08-088023; Date of Publication of Application Apr. 2, 1996 in the Hibara et al.
Megahed et al., "Lithium-ion rechargeable batteries", Journal of Power Sources, 1994, 25 pgs., vol. 51, Elsevier Science.
Patent Abstracts of Japan, Publication No. 2000-331710, dated Nov. 30, 2000, in the name of Hong Gan et al.
Patent Abstracts of Japan, Publication No. 2001-319685, dated Nov. 16, 2001, in the name of Atsushi Terahara et al.
China Office action dated May 23, 2008, for China application 2006101214770, with English translation indicating relevance of references listed in this IDS.
Patent Abstracts of Japan for Publication No. 60-023973, dated Feb. 6, 1985 in the name of Kazumi Yoshimitsu et al.
Patent Abstracts of Japan for Publication No. 61-227377; dated Oct. 9, 1986 in the name of Riichi Shishikura et al.
Patent Abstracts of Japan for Publication No. 61-284070; dated Dec. 15, 1986 in the name of Riichi Shishikura et al.
Patent Abstracts of Japan for Publication No. 04-184870; dated Jul. 1, 1992 in the name of Makoto Ue.
Patent Abstracts of Japan for Publication No. 08-088023; dated Apr. 2, 1996 in the name of Akio Hibara et al.
Patent Abstracts of Japan for Publication No. 2001-052965; dated Feb. 23, 2001 in the name of Satoko Mita et al.
Japanese Office action dated Nov. 10, 2009, for corresponding Japanese application 2006-226945, noting Japanese reference 2001-052965, and Japanese reference 2001-319685, previously filed in an IDS dated Sep. 18, 2007 with English translation.

* cited by examiner

ORGANIC ELECTROLYTIC SOLUTION AND LITHIUM BATTERY USING THE SAME

CROSS-REFERENCE TO RELATED PATENT APPLICATIONS

This application claims priority to and the benefit of Korean Patent Application No. 10-2005-0078037, filed on Aug. 24, 2005 in the Korean Intellectual Property Office, the entire content of which is incorporated herein by reference.

BACKGROUND OF THE INVENTION

1. Field of the Invention

The present invention relates to organic electrolytic solutions for improving flame resistance and charge/discharge properties and to lithium batteries including the same.

2. Description of the Related Art

As demand increases for lightweight, portable high performance electronic devices such as camcorders, mobile phones, and laptop computers, research is being conducted into batteries used as power sources for such devices. In particular, rechargeable lithium secondary batteries have 3 times the energy density per unit weight of Pb storage batteries, Ni—Cd batteries, Ni—H batteries, and Ni—Zn batteries. In addition, lithium secondary batteries can be quickly charged. Therefore, research into and development of rechargeable lithium secondary batteries are increasing.

In general, lithium batteries operate at high operating voltages so that conventional aqueous electrolytic solutions cannot be used due to the violent reaction between the aqueous solution and the lithium contained in the anode. Accordingly, lithium batteries use organic electrolytic solutions prepared by dissolving lithium salts in organic solvents. To that end, organic solvents having high ionic conductivity, high permittivity, and low viscosity are desired. However, it is difficult to obtain organic solvents having these properties. As a result, lithium batteries use mixed solvents containing one organic solvent having high permittivity and another organic solvent having low viscosity.

When a lithium secondary battery uses a carbonate-based polar non-aqueous solvent, the reaction the electrolytic solution with carbon acting as an anode requires excess charges during initial charging. As a result of such an irreversible reaction, a passivation layer (such as a solid electrolyte interface (SEI) membrane) is formed on the surface of the anode. The SEI membrane allows the battery to be stably charged and discharged without further decomposition of the electrolytic solution. The SEI membrane also acts as an ion tunnel through which only lithium ions pass, and prevents cointercalation of the organic solvent (which solvates lithium ions and moves with the lithium ions into the carbon anode), thereby preventing a breakdown of the anode structure.

However, during charging and discharging, the lithium battery is repeatedly subjected to high voltages of 4V or greater. Under such conditions, the SEI membrane (formed of only a polar solvent and a lithium salt) cannot retain the ideal properties described above. That is, the SEI membrane cracks, and thus an insoluble salt precipitates inside and outside of the anode, and gas is generated as the solvent is continuously reduced. Accordingly, the internal pressure of the lithium battery increases and the structure of the lithium battery cracks, making it possible for the electrolytic solution to leak. Furthermore, due to the leaking electrolytic solution, the lithium oxide at the cathode can be exposed to moisture in the air, thereby igniting the lithium battery. In addition, when the battery is frequently exposed to overcharge conditions, the battery becomes overloaded, causing an exothermic reaction to occur therein. When the temperature of the battery is greater than a predetermined temperature, high temperature ignition can occur. Such high temperature ignition is primarily caused by the electrolytic solution.

These problems have been addressed by adding a flame-resistant agent to the electrolytic solution. One such flame-resistant agent is an alkyl phosphoric acid ester $((RO)_3P{=}O)$. Such phosphoric acid ester compounds have good flame resistance but can be oxidized or reduced depending on the type of anode used. As a result, an excess amount of phosphoric acid ester compound should be used. In particular, when a graphite-based electrode is used as the anode, use of an excessive amount of the compound leads to a substantial decrease in the charge/discharge efficiency of the battery.

Accordingly, there is a need for an organic electrolytic solution having flame resistant properties (self extinguishing properties) and excellent charge/discharge properties which can be used to manufacture a safe and reliable lithium battery.

SUMMARY OF THE INVENTION

In one embodiment of the present invention, an organic electrolytic solution is flame resistant and is used to form a reliable, stable battery having improved charge/discharge properties.

In another embodiment of the present invention, a lithium battery includes the organic electrolytic solution.

According to one embodiment of the present invention, an organic electrolytic solution includes a lithium salt, an organic solvent including a first solvent having high permittivity and a second solvent having a low boiling point, and a phosphine oxide compound represented by Formula 1.

In Formula 1, each of $R_1$, $R_2$, $R_3$, $R_4$, $R_5$, $R_6$, $R_7$, $R_8$, $R_9$, $R_{10}$, $R_{11}$, and $R_{12}$ is independently one of a C1 to C20 unsubstituted alkyl group, a C1 to C20 halogen substituted alkyl group, a C6 to C30 unsubstituted aryl group, a C6 to C30 halogen substituted aryl group, a C2 to C30 unsubstituted heteroaryl group, or a C2 to C30 halogen substituted heteroaryl group. Each of l and n is 0 or 1.

In another embodiment, the phosphine oxide compound may be a compound represented by Formula 2.

(2)

In Formula 2, $R_4$, $R_5$, $R_6$, $R_7$, $R_8$, $R_9$, $R_{10}$, $R_{11}$, and $R_{12}$ are as described above and m is an integer ranging from 0 to 5.

In yet another embodiment, the phosphine oxide compound may be a compound represented by Formulae 3 or 4.

(3)

(4)

In Formulae 3 and 4, $R_4$, $R_5$, $R_6$, $R_7$, $R_8$, $R_9$, $R_{10}$, $R_{11}$, and $R_{12}$ are as described above.

In still another embodiment, the phosphine oxide compound may be a compound represented by Formulae 5 or 6.

(5)

(6)

In one embodiment of the organic electrolytic solution, the phosphine oxide compound is present in an amount ranging from about 0.5 to about 20 wt % based on the total weight of the organic solvent. In another embodiment of the organic electrolytic solution, the phosphine oxide compound is present in an amount ranging from about 1 to about 10 wt % based on the total weight of the organic solvent.

In one embodiment of the organic electrolytic solution, the lithium salt is present in a concentration ranging from about 0.5 to about 2.0 M.

In one embodiment of the organic electrolytic solution, the first solvent having high permittivity may include at least one compound selected from ethylene carbonate, polypropylene carbonate, butylene carbonate, and γ-butyrolactone.

In one embodiment of the organic electrolytic solution, the second solvent having a low boiling point may include at least one compound selected from dimethyl carbonate, ethylmethyl carbonate, diethyl carbonate, dipropyl carbonate, dimethoxyethane, diethoxyethane, and aliphatic ester derivatives.

In one embodiment of the organic electrolytic solution, the lithium salt may be $LiPF_6$, the first solvent having high permittivity may be ethylene carbonate, the second solvent having a low boiling point may be diethyl carbonate, and the phosphine oxide compound may be tris(trimethylsilyloxymethyl)phosphineoxide.

According to another embodiment of the present invention, a lithium battery includes a cathode, an anode, and the organic electrolytic solution described above.

BRIEF DESCRIPTION OF THE DRAWINGS

The above and other features and advantages of the present invention will become more apparent by reference to the following detailed description when considered in conjunction with the attached drawings in which.

DETAILED DESCRIPTION OF THE INVENTION

An organic electrolytic solution according to one embodiment of the present invention includes a phosphine oxide compound containing silicon atoms instead of a phosphoric ester compound (which decreases the charge/discharge properties of the battery). The phosphine oxide compound imparts flame resistance and good charge/discharge properties, thus producing a highly stable and highly reliable battery having good charge/discharge efficiency.

An organic electrolytic solution according to one embodiment of the present invention includes a lithium salt, an organic solvent including a first solvent having high permittivity and a second solvent having a low boiling point, and a phosphine oxide compound represented by Formula 1.

(1)

In Formula 1, each of $R_1$, $R_2$, $R_3$, $R_4$, $R_5$, $R_6$, $R_7$, $R_8$, $R_9$, $R_{10}$, $R_{11}$, and $R_{12}$ is independently one of a C1 to C20 unsubstituted alkyl group, a C1 to C20 halogen substituted alkyl group, a C6 to C30 unsubstituted aryl group, a C6 to C30 halogen substituted aryl group, a C2 to C30 unsubstituted heteroaryl group, or a C2 to C30 halogen substituted heteroaryl group. Each of l and n is 0 or 1.

The following description of exemplary phosphine oxide compounds containing silicon atoms represented by Formula 1 is presented to promote a better understanding of the present invention. However, it is understood that the phosphine oxide compound is not limited.

In one embodiment, the phosphine oxide compound containing silicon atoms includes a phosphorous atom which reacts with and removes hydrogen radicals generated from the organic solvent during charging and discharging. When excess hydrogen radicals are present in the solvent, they can react with the solvent to generate hydrogen gas, thereby increasing the internal pressure of the battery. The phosphine oxide compound improves the stability of the cathode because of its bulky silyl or siloxy structure. The phosphine oxide compound also improves flame resistance of the electrolytic solution because hydrogen atoms present in the phosphine oxide compound can be completely or partially substituted with halogen atoms (e.g. fluorine), which are chemically stable.

In a compound represented by Formula 1, for example, an alkylsiloxy group is separated into radicals or anions when the C—O bond is broken during an oxidation or reduction reaction. The separated alkylsiloxy group bonds to a lithium ion to thereby form an insoluble compound which precipitates on the surface of a carbon electrode acting as an anode. As a result, the composition of the solid electrolyte interface (SEI) membrane (which is formed from only a polar organic solvent) changes, enabling maintenance of a stable SEI member, even after a long charge/discharge cycle. The modified, stable SEI membrane effectively prevents flow of the organic solvent (which has solvated lithium ions into the anode during intercalation), thereby substantially preventing direct contact between the organic solvent and the anode and enabling reversibly charging and discharging of the lithium ions. This improves the long-term performance of the battery. In addition, the SEI membrane acts as a barrier, blocking the reaction heat generated during the oxidation/reduction reaction.

In another embodiment of the organic electrolytic solution, the phosphine oxide compound may be a compound represented by Formula 2.

(2)

In formula 2, each of $R_4$, $R_5$, $R_6$, $R_7$, $R_8$, $R_9$, $R_{10}$, $R_{11}$, and $R_{12}$ are as described above, and m is an integer ranging from 0 to 5.

In yet another embodiment of the organic electrolytic solution, the phosphine oxide compound may be a compound represented by Formulae 3 or 4.

(3)

(4)

In Formulae 3 and 4, each of $R_4$, $R_5$, $R_6$, $R_7$, $R_8$, $R_9$, $R_{10}$, $R_{11}$, and $R_{12}$ are as described above.

In still another embodiment, the phosphine oxide compound may be a compound represented by Formulae 5 or 6.

(5)

and

-continued (6)

In one embodiment, the phosphine oxide compound of any one of Formulae 1 through 7 may be present in the organic electrolytic solution in an amount ranging from about 0.5 to about 20 wt % based on the total weight of the organic solvent. In another embodiment, the phosphine oxide compound is present in an amount ranging from about 1 to about 10 wt % based on the total weight of the organic solvent. When the phosphine oxide compound is present in an amount greater than about 20 wt %, the amount of effective material affecting the performance of the battery is small and the charge/discharge properties of the battery degrade. On the other hand, when the phosphine oxide compound is present in an amount less than about 0.5 wt %, the desired objective of the present invention is difficult to obtain.

The first solvent having high permittivity can be any solvent commonly used in the art. Nonlimiting examples of suitable first solvents include gamma-butyrolactone, cyclic carbonates such as ethylene carbonate, propylene carbonate and butylene carbonate, etc.

The second solvent having a low boiling point can be any solvent commonly used in the art. Nonlimiting examples of suitable second solvents include chain carbonates such as dimethyl carbonate, ethylmethyl carbonate, diethyl carbonate and dipropyl carbonate, dimethoxyethane, diethoxyethane, aliphatic ester derivatives, etc.

The first and second solvents are mixed in a volume ratio ranging from about 1:1 to about 1:9. When the volume ratio is outside this range, the discharge capacity and charge/discharge lifetime of the battery decrease.

The lithium salt can be any lithium salt commonly used in lithium batteries. Nonlimiting examples of suitable lithium salts include $LiClO_4$, $LiCF_3SO_3$, $LiPF_6$, $LiN(CF_3SO_2)$, $LiBF_4$, $LiC(CF_3SO_2)_3$, $LiN(C_2F_5SO_2)_2$ and mixtures thereof.

The concentration of the lithium salt in the organic electrolytic solution ranges from about 0.5 to about 2 M. When the concentration of the lithium salt is less than about 0.5 M, conductivity of the organic electrolytic solution decreases, thereby decreasing the performance of the organic electrolytic solution. On the other hand, when the concentration of the lithium salt is greater than about 2.0 M, the viscosity of the organic electrolytic solution increases, thereby decreasing the mobility of the lithium ions.

An organic electrolytic solution according to one embodiment of the present invention includes $LiPF_6$ as the lithium salt, ethylene carbonate as the first solvent having high permittivity, diethyl carbonate as the second solvent having a low boiling point, and tris(trimethylsilyloxymethyl)phosphineoxide as the phosphine oxide compound.

A lithium battery including an organic electrolytic solution according to one embodiment of the present invention and a method of manufacturing the same will now be described in detail.

Figure 3:
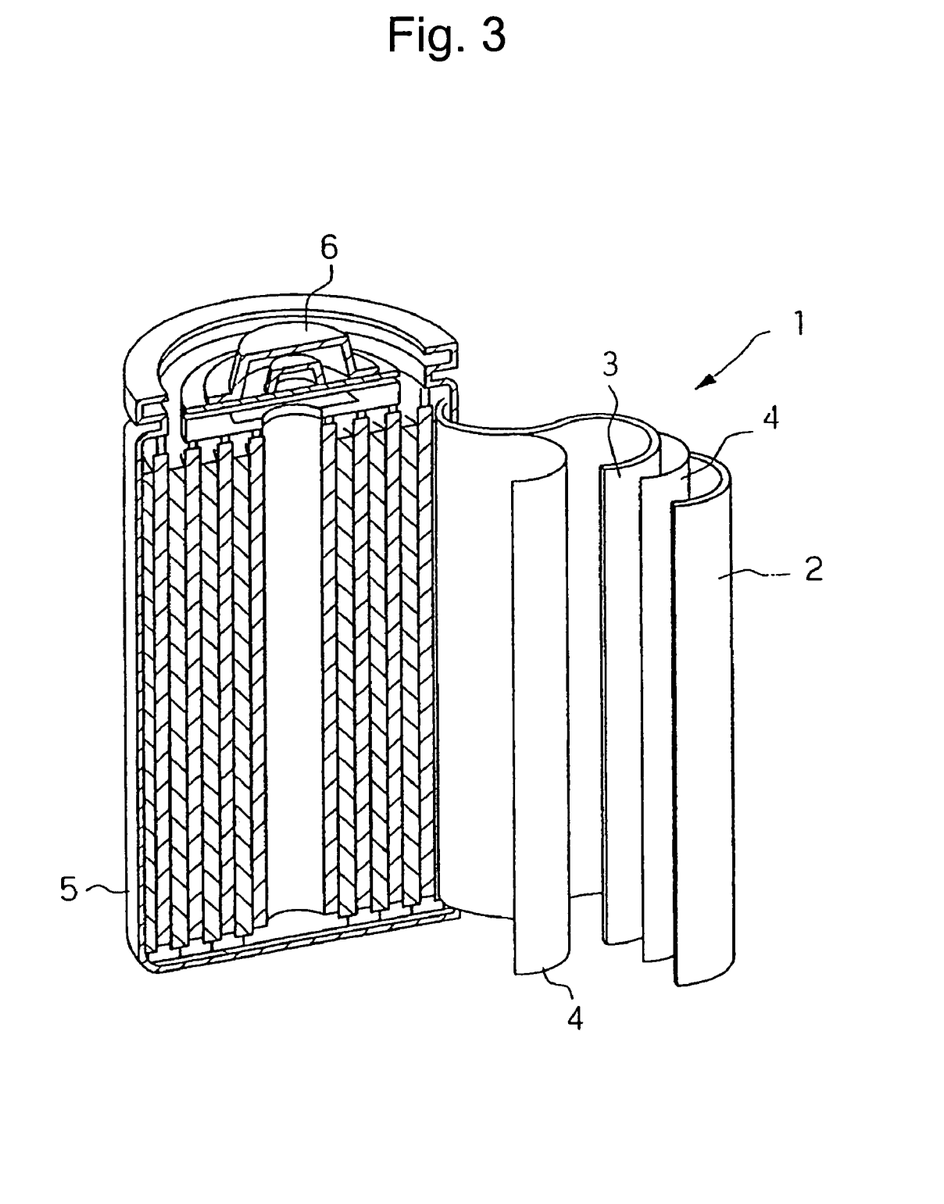
FIG. 3 is a schematic perspective view of a lithium battery according to one embodiment of the present invention.

As shown in FIG. 3, a lithium 1 battery according to one embodiment of the present invention includes a cathode 2, an anode 3, and an organic electrolytic solution according to the present invention. The cathode 2 and anode 3 are insulated from each other by a separator 4 and the cathode 2, anode 3 and separator 4 are wound together to form an electrode assembly. The electrode assembly is placed in a battery case 5 and the battery case 5 is then sealed with a cap assembly 6.

The type of lithium battery is not limited. The lithium battery can be a lithium primary battery or a lithium secondary battery such as a lithium ion battery, a lithium ion polymer battery or a lithium sulfur battery.

The C1 to C20 alkyl group (which is used as the substituent for phosphine oxide compounds according to certain embodiments of the present invention) can be a linear or branched radical group. In one embodiment, the linear or branched alkyl group has from 1 to 12 carbon atoms. In another embodiment, the alkyl group has from 1 to 6 carbon atoms. In yet another embodiment, the alkyl group has from 1 to 3 carbon atoms. Nonlimiting examples of suitable C1 to C20 alkyl groups include methyl groups, ethyl groups, n-propyl groups, isopropyl groups, n-butyl groups, isobutyl groups, sec-butyl groups, t-butyl groups, pentyl groups, iso-amyl groups, hexyl groups, etc.

The C6 to C30 aryl group (which is used as the substituent for phosphine oxide compounds according to certain embodiments of the present invention) may be used alone or in combination, and refers to a C6 to C30 carbocyclic aromatic system including at least one ring. The rings may be attached together by fusing or by using a pendent method. The aryl group may include an aromatic radical, such as phenyl, naphthyl, tetrahydronaphthyl, indanyl, or biphenyl. In one embodiment, the aryl group is a phenyl group. The aryl group may have from 1 to 3 substituents selected from hydroxy, halo, haloalkyl, nitro, cyano, alkoxy, and a low alkylamino.

The C2 to C30 heteroaryl group (which is used as the substituent for phosphine oxide compounds according to certain embodiments of the present invention) refers to a monovalent, monocyclic or bicyclic aromatic radical containing from 5 to 30 ring atoms with 1, 2, or 3 heteroatoms selected from N, O, or S, where the other ring atoms are carbon atoms. In addition, the C2 to C30 heteroaryl group refers to a monovalent, monocyclic or bicyclic aromatic radical in which the heteroatoms are oxidized or quaternized to form, for example, an N-oxide or a quaternary salt. Nonlimiting examples of suitable C2 to C30 heteroaryl groups include thienyl groups, benzothienyl groups, pyridyl groups, pyrazinyl groups, pyrimidinyl groups, pyridazinyl groups, quinolinyl groups, quinoxalinyl groups, imidazolyl groups, furanyl groups, benzofuranyl groups, thiazolyl groups, isoxazolyl groups, benzisoxazolyl groups, benzimidazolyl groups, triazolyl groups, pyrazolyl groups, pyrrolyl groups, indolyl groups, 2-pyridonyl groups, 4-pyridonyl groups, N-alkyl-2-pyridonyl groups, pyrazinonyl groups, pyridazinonyl groups, pyrimidinonyl groups, oxazolonyl groups, quaternary salts thereof and N-oxides thereof, such as pyridyl N-oxide and quinolinyl N-oxide.

A method of manufacturing a lithium battery according to one embodiment of the present invention will now be described.

First, a cathode active material, a conductive agent, a binder, and a solvent are mixed to prepare a cathode active material composition. The cathode active material composition can be coated directly on an aluminum current collector and then dried to prepare a cathode plate. Alternatively, the cathode active material composition can be cast on a separate support to form a film and then separating the film from the support and laminating the film on an aluminum current collector to prepare a cathode plate.

The cathode active material is not limited and can be any lithium-containing metal oxide commonly used in the art.

Nonlimiting examples of suitable cathode active materials include $LiCoO_2$, $LiMn_xO_{2x}$, $LiNi_{x-1}Mn_xO_{2x}$ where x is 1 or 2, and $Ni_{1-x-y}Co_xMn_yO_2$ where $0 \leq x \leq 0.5$ and $0 \leq y \leq 0.5$.

Nonlimiting examples of suitable conductive agents include carbon black, etc. Nonlimiting examples of suitable binders include vinylidene fluoride/hexafluoropropylene copolymers, polyvinylidenefluoride, polyacrylonitrile, polymethylmethacrylate, polytetrafluoroethylene and mixtures thereof. Other suitable binders include styrene butadiene rubber based polymers. Nonlimiting examples of suitable solvents include N-methylpyrrolidone, acetone, water, etc. The amounts of the cathode active material, the conductive agent, the binder, and the solvent are the same as those in conventional lithium batteries.

Similarly, an anode active material, a conductive agent, a binder, and a solvent are mixed to prepare an anode active material composition. The composition can be coated directly on a copper current collector to prepare an anode plate. Alternatively, the composition can be cast on a separate support to form a film, which is then separated from the support and laminated on a copper current collector to prepare an anode plate. The amounts of the anode active material, the conductive agent, the binder, and the solvent are the same as those in conventional lithium batteries.

Nonlimiting examples of suitable anode active materials include silicon metal, silicon thin films, lithium metal, lithium alloys, carbonaceous materials, and graphite. The anode active material composition and the cathode active material composition use the same conductive agent, the same binder, and the same solvent. When needed, the anode active material composition and the cathode active material composition may further include a plasticizer to from pores in the electrode plates.

The separator can be any separator commonly used in lithium batteries. In particular, use of a separator having low resistance to ion mobility and good ability to retain the electrolytic solution is desired. Nonlimiting examples of suitable separators include glass fiber, polyester, Teflon, polyethylene, polypropylene, polytetrafluoroethylene (PTFE), and mixtures thereof, each of which can be a nonwoven fabric or a woven fabric. For example, a lithium ion battery may use a foldable separator formed of polyethylene or polypropylene, and a lithium ion polymer battery may use a separator having good ability to retain the organic electrolytic solution.

In an exemplary method of making a separator, a polymer resin, a filler, and a solvent are mixed to prepare a separator composition. The separator composition can be coated directly on an electrode and dried to form a separator film. Alternatively, the separator composition can be cast on a separate support and dried to form a film which is then separated from the support and laminated on an electrode.

The polymer resin is not limited and can be any material that is used as a binder for an electrode plate. Nonlimiting examples of suitable polymer resins include vinylidene fluoride/hexafluoropropylene copolymers, polyvinylidenefluoride, polyacrylonitrile, polymethylmethacrylate, and mixtures thereof. In one embodiment, the polymer resin is a vinylidene fluoride/hexafluoropropylene copolymer in which the amount of hexafluoropropylene ranges from about 8 to 25 wt %.

The separator is positioned between the cathode plate and the anode plate described above to form an electrode assembly. The electrode assembly is wound or folded and placed in a spherical or rectangular battery case. An organic electrolytic solution according to the present invention is then injected into the battery case to form a lithium ion battery.

Alternatively, a battery can be prepared by stacking a plurality of electrode assemblies in a bi-cell structure and immersing the structure in an organic electrolytic solution. The resulting assembly is placed in a pouch and sealed to form a lithium ion polymer battery.

The present invention will be described in further detail with reference to the following examples. The examples are presented for illustrative purposes only and are not intended to limit the scope of the present invention.

EXAMPLE 1

Preparation of Electrolytic Solution

A mixed organic solvent of 30 vol % ethylene carbonate and 70 vol % diethyl carbonate, 1 wt % of tris(trimethylsilyloxymethyl)phosphine oxide (represented by Formula 5 below) as an additive and 1.3M $LiPF_6$ as a lithium salt were mixed to prepare an organic electrolytic solution.

(5)

EXAMPLE 2

Preparation of Electrolytic Solution

An organic electrolytic solution was prepared as in Example 1, except that 5 wt % of tris-(trimethylsilyloxymethyl)phosphine oxide was used.

EXAMPLE 3

Preparation of Electrolytic Solution

An organic electrolytic solution was prepared as in Example 1, except that 10 wt % of tris(trimethylsilyloxymethyl)phosphine oxide was used.

EXAMPLE 4

Preparation of Electrolytic Solution

An organic electrolytic solution was prepared as in Example 1, except that 0.5 wt % of tris(trimethylsilyloxymethyl)phosphine oxide was used.

EXAMPLE 5

Preparation of Electrolytic Solution

An organic electrolytic solution was prepared as in Example 1, except that 20 wt % of tris(trimethylsilyloxymethyl)phosphine oxide was used.

COMPARATIVE EXAMPLE 1

Preparation of Electrolytic Solution

A mixed organic solvent of 30 vol % ethylene carbonate and 70 vol % diethyl carbonate and 1.3M $LiPF_6$ as a lithium salt were mixed to prepare an organic electrolytic solution. In this Comparative Example, no additive was used.

COMPARATIVE EXAMPLE 2

Preparation of Electrolytic Solution

An organic electrolytic solution was prepared as in Example 1, except that 0.05 wt % of tris(trimethylsilyloxymethyl)phosphine oxide was used.

COMPARATIVE EXAMPLE 3

Preparation of Electrolytic Solution

An organic electrolytic solution was prepared as in Example 1, except that 30 wt % of tris(trimethylsilyloxymethyl)phosphine oxide was used.

EXAMPLE 6

Manufacturing of Lithium Batteries 96 wt % of graphite based powder as an anode active material, 4 wt % of PVdF as a binder, and 100 ml of N-methylpyrrolidone (NMP) were mixed and a ceramic ball was added to the mixture. The mixture was stirred for about 10 hours. The resulting mixture was coated on a copper film having a thickness of 19 µm using a 300 µm-interval doctor blade, and the film was dried for about 10 hours in a 90° C. oven to remove the NMP. The resulting film was roll pressed to produce an anode having a thickness of 120 µm.

A lithium electrode (as a counter electrode to the anode) was prepared by pressing 100 µm-thick lithium metal onto a 20 µm-thick copper foil. As a result, an electrode having a thickness 120 µm was prepared.

A 2015-standard coin cell was prepared using the anode having a size of 2×3 cm$^2$, a PTFE separator, the lithium electrode as a counter electrode, and the organic electrolytic solution prepared according to Example 1.

EXAMPLE 7

Preparation of Lithium Batteries

A 2015-standard coin cell was prepared as in Example 6, except that the organic electrolytic solution according to Example 2 was used.

EXAMPLE 8

Preparation of Lithium Batteries

A 2015-standard coin cell was prepared as in Example 6, except that the organic electrolytic solution according to Example 3 was used.

EXAMPLE 9

Preparation of Lithium Batteries

A 2015-standard coin cell was prepared as in Example 6, except that the organic electrolytic solution according to Example 4 was used.

EXAMPLE 10

Preparation of Lithium Batteries

A 2015-standard coin cell was prepared as in Example 6, except that the organic electrolytic solution according to Example 5 was used.

COMPARATIVE EXAMPLE 4

Preparation of Lithium Batteries

A 2015-standard coin cell was prepared as in Example 6, except that the organic electrolytic solution according to Comparative Example 1 was used.

COMPARATIVE EXAMPLE 5

Preparation of Lithium Batteries

A 2015-standard coin cell was prepared as in Example 6, except that the organic electrolytic solution according to Comparative Example 2 was used.

COMPARATIVE EXAMPLE 6

Preparation of Lithium Batteries

A 2015-standard coin cell was prepared as in Example 6, except that the organic electrolytic solution according to Comparative Example 3 was used.

EXPERIMENTAL EXAMPLE 1

Measurement of Flame Resistance of Electrolytic Solutions

Each of the electrolytic solutions prepared according to Examples 1 through 5 and Comparative Examples 1 through 3 were poured into beakers. Then, a thin glass fiber filter paper having a width of 15 mm, a length of 300 mm, and a thickness of 0.19 mm was immersed in each of the beakers for 10 minutes. Subsequently, the excess electrolytic solution soaked into the glass fiber filter paper was removed by contacting the paper with an edge of the beaker. Then, one end of each resulting glass fiber filter paper was clipped and vertically dangled. The lower end of each filter paper was heated using a gas lighter for three seconds. The time required to extinguish each soaked paper was measured, and the results are shown in Table 1.

TABLE 1

| | Amount of Phosphine Oxide(wt %) | Time for extinguishment (sec) |
|---|---|---|
| Example 1 | 1 | 8.2 |
| Example 2 | 5 | 8.2 |
| Example 3 | 10 | 6.4 |
| Example 4 | 0.5 | 8.4 |
| Example 5 | 20 | 6.1 |
| Comparative Example 1 | 0 | 8.4 |
| Comparative Example 2 | 0.05 | 8.4 |
| Comparative Example 3 | 30 | 6.2 |

As shown in Table 1, the electrolytic solutions prepared according to Examples 1 through 5 required a shorter time for extinguishment than the electrolytic solution prepared according to Comparative Example 1 in which tris(trimethylsilyloxymethyl)phosphine oxide was not added. This may be due to the addition of the flame-resistant additive. Those solutions including 5, 10, 0.5 and 20 wt % of the phosphine oxide compound showed a clear reduction in time for extinguishment.

EXPERIMENTAL EXAMPLE 2

Charge/Discharge Property Tests

Each of the coin cells manufactured according to Examples 6-10 and Comparative Examples 4-6 was charged with constant current of 60 mA per 1 g of the active material until a voltage of 0.001 V with respect to the Li electrode was reached. Each cell was then continuously charged with constant voltage of 0.001 V applied until the current decreased to 5 mA per 1 g of the active material. Subsequently, each charged coin cell was discharged with constant current of 60 mA per 1 g of the active material until a voltage of 1.5 V was reached. As a result, charge/discharge capacity was obtained and the charge/discharge efficiency was measured. The charge/discharge efficiency is represented by Equation 1.

Charge/Discharge Efficiency (%)=Discharge Capacity/Charge Capacity        Equation 1

The charge/discharge capacity and the charge/discharge efficiency were measured at each cycle. The test results for the coin cells manufactured according to Examples 6-10 and Comparative Examples 4-6 are shown in Table 2 and in FIGS. 1 and 2.

TABLE 2

| | First Cycle | | | Tenth Cycle | | |
|---|---|---|---|---|---|---|
| | Charge Capacity (mAh/g) | Discharge Capacity (mAh/g) | Charge/Discharge Efficiency | Charge Capacity (mAh/g) | Discharge Capacity (mAh/g) | Charge/Discharge Efficiency |
| Example 6 | 260 | 247 | 95% | 201 | 201 | 100% |
| Example 7 | 248 | 229 | 92% | 218 | 217 | 100% |
| Example 8 | 205 | 183 | 89% | 125 | 124 | 100% |
| Example 9 | 264 | 245 | 93% | 166 | 165 | 100% |
| Example 10 | 200 | 171 | 86% | 119 | 119 | 100% |
| Comparative Example 4 | 267 | 244 | 91% | 154 | 153 | 100% |
| Comparative Example 5 | 262 | 238 | 91% | 166 | 165 | 100% |
| Comparative Example 6 | 185 | 154 | 83% | 116 | 117 | 100% |

Figure 1:
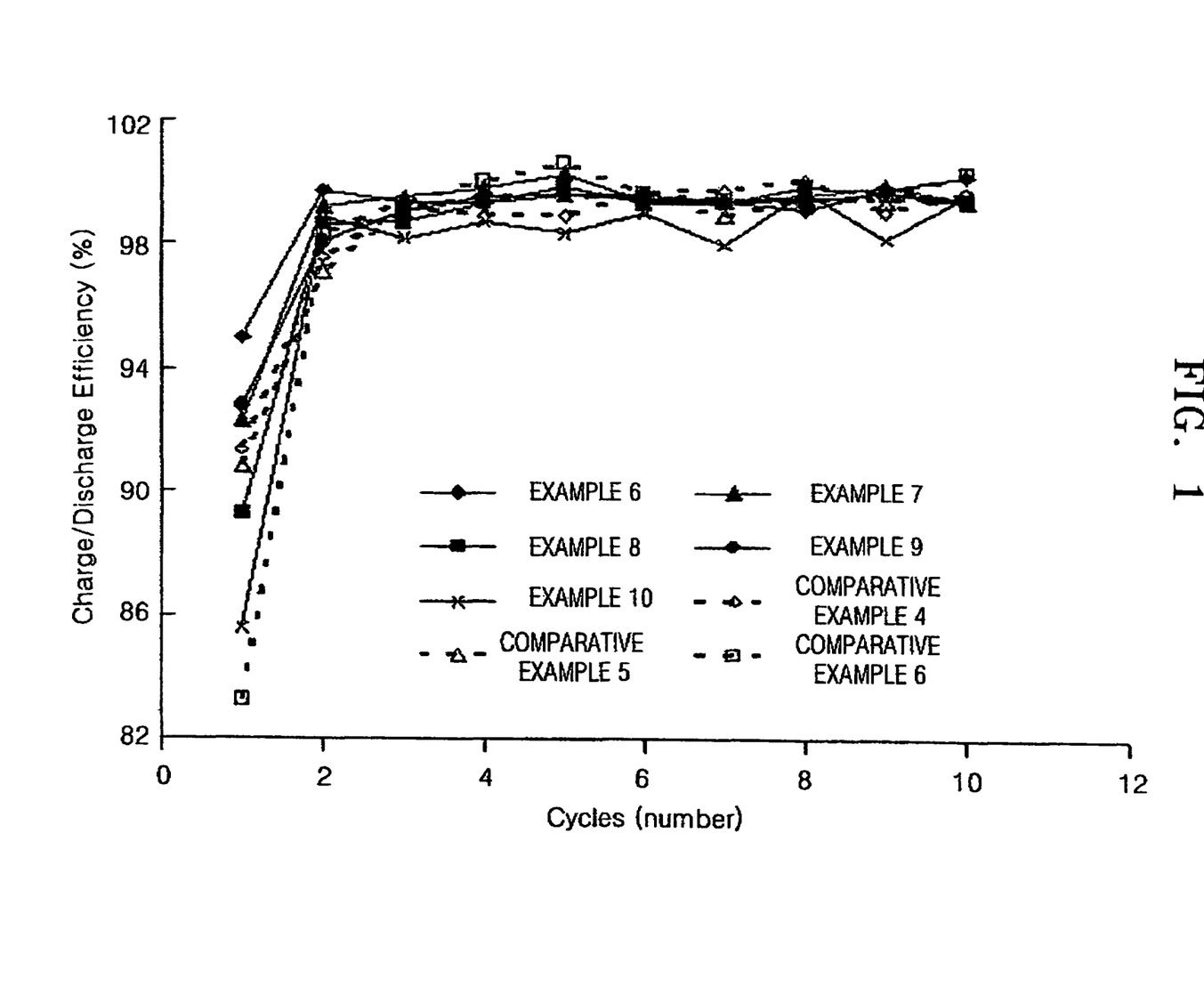
FIG. 1 is a graph of charge/discharge efficiencies of the lithium batteries prepared according to Examples 6 through 10 and Comparative Examples 4 through 6.
Figure 2:
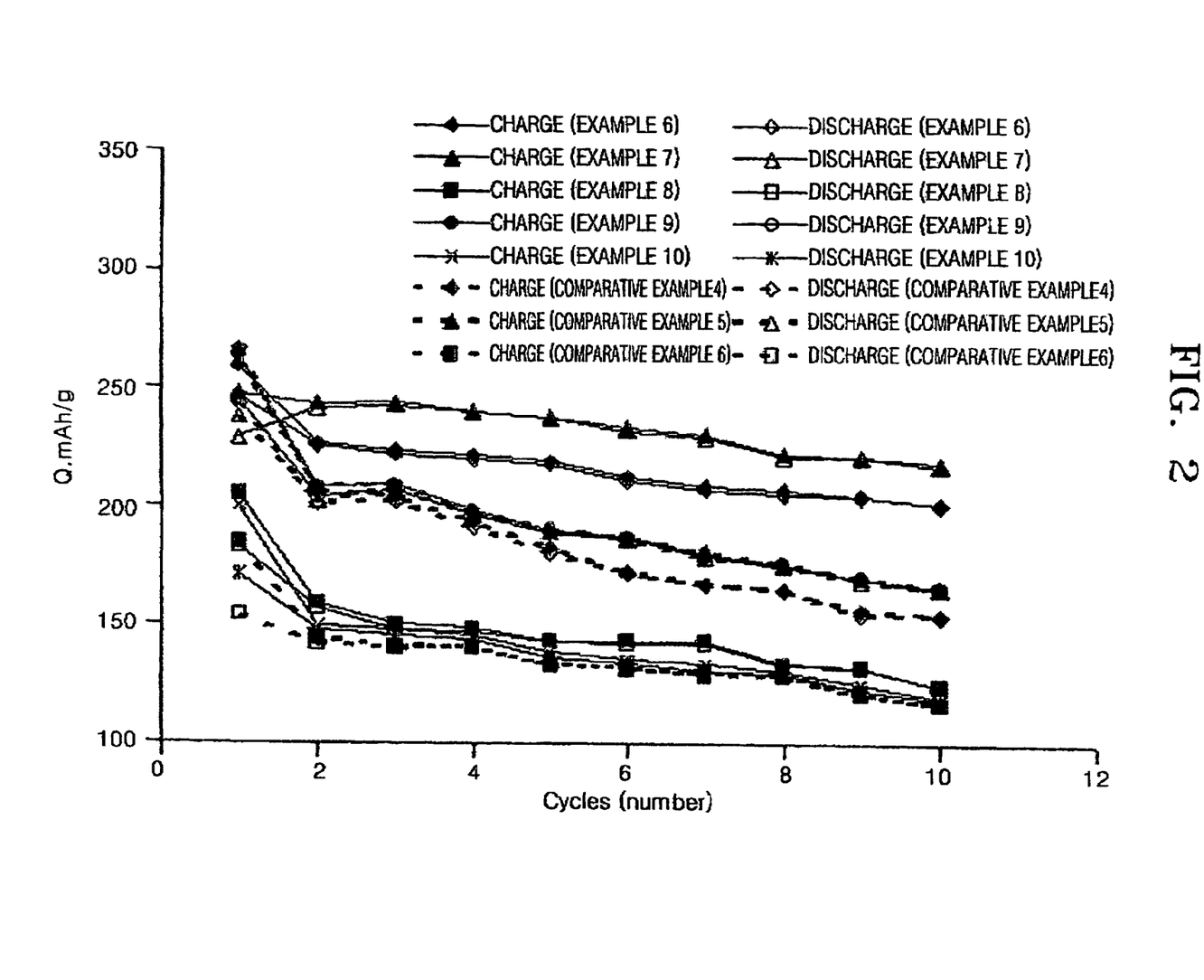
FIG. 2 is a graph of charge/discharge capacities of the lithium batteries prepared according to Examples 6 through 10 and Comparative Examples 4 through 6, wherein IIC denotes irreversible capacitance.

Referring to Table 2, when the amount of the phosphine oxide compound added was small, the initial charge/discharge efficiency was high, whereas when the amount of the phosphine oxide compound added was large, the initial charge/discharge efficiency was low. The coin cells prepared according to Example 6, 7 and 9 (in which a phosphine oxide compound was used) showed higher charge/discharge efficiencies than the coin cell prepared according to Comparative Example 4 (in which no phosphine oxide compound was used). In addition, as shown in Table 1, the coin cells prepared according to Examples 6, 7 and 9 required less time to extinguish than the coin cell prepared according to Comparative Example 4. When the amount of the phosphine oxide compound added was increased to 10 wt % and 20 wt %, the initial charge/discharge efficiency was not as good. That is, the coin cells prepared according to Examples 8 and 10 showed lower charge/discharge efficiencies than the coin cell prepared according to Comparative Example 4. When the amount of the phosphine oxide compound added was 0.5, 1, 10, and 20 wt % as in Examples 6 through 10, the coin cells showed good initial charge/discharge efficiency of 86% or better, and showed constant charge/discharge efficiencies after the fourth cycle, as shown in FIG. 1. Such an improvement in the charge/discharge properties may result from the high stability of the SEI film on the electrode surface imparted by the phosphine oxide compound with the bulky siloxy structure. However, when the amount of the phosphine oxide compound was increased beyond a predetermined level, the SEI film became thick and interfacial resistance increased. As a result, the charge/discharge efficiency of the cell decreased.

The organic electrolytic solutions and lithium batteries according to the present invention exhibit flame resistance and good charge/discharge properties by using phosphine oxide compounds in the organic electrolytic solution. Accordingly, the inventive lithium batteries are highly stable and reliable, and have good charge/discharge efficiencies.

While the present invention has been described with reference to certain exemplary embodiments, it will be understood by those of ordinary skill in the art that various alterations and changes may be made without departing from the spirit and scope of the present invention as defined by the following claims.

What is claimed is:

1. An organic electrolytic solution comprising:
a lithium salt;
an organic solvent comprising a first solvent having high permittivity and a second solvent having a low boiling point; and
a phosphine oxide compound represented by Formula 1:

where l is 1, n is 0 or 1 and each of $R_1$, $R_2$, $R_3$, $R_4$, $R_5$, $R_6$, $R_7$, $R_8$, $R_9$, $R_{10}$, $R_{11}$, and $R_{12}$ is independently selected from the group consisting of C1 to C20 unsubstituted alkyl groups, C1 to C20 halogen substituted alkyl groups, C6 to C30 unsubstituted aryl groups, C6 to C30 halogen substituted aryl groups, C2 to C30 unsubstituted heteroaryl groups, and C2 to C30 halogen substituted heteroaryl groups, wherein the phosphine oxide compound is present in an amount ranging from about 0.5 to about 20 wt % based on the total weight of the organic solvent.

2. The organic electrolytic solution of claim 1, wherein the phosphine oxide compound comprises a compound represented by Formula 2:

(2)

where m is an integer ranging from 1 to 5.

3. The organic electrolytic solution of claim 1, wherein the phosphine oxide compound is selected from the group consisting of compounds represented by Formula 3:

(3)

4. The organic electrolytic solution of claim 1, wherein the phosphine oxide compound is selected from the group consisting of compounds represented by Formula 5:

(5)

5. The organic electrolytic solution of claim 1, wherein the phosphine oxide compound is present in an amount ranging from about 1 to about 10 wt % based on the total weight of the organic solvent.

6. The organic electrolytic solution of claim 1, wherein the lithium salt is present in a concentration ranging from about 0.5 to about 2.0 M.

7. The organic electrolytic solution of claim 1, wherein the first solvent having high permittivity is selected from the group consisting of ethylene carbonate, polypropylene carbonate, butylene carbonate, gamma-butyrolactone, and mixtures thereof.

8. The organic electrolytic solution of claim 1, wherein the second solvent having a low boiling point is selected from the group consisting of dimethyl carbonate, ethylmethyl carbonate, diethyl carbonate, dipropyl carbonate, dimethoxyethane, diethoxyethane, aliphatic ester derivatives, and mixtures thereof.

9. The organic electrolytic solution of claim 1, wherein the lithium salt is $LiPF_6$, the first solvent having high permittivity is ethylene carbonate, the second solvent having a low boiling point is diethyl carbonate, and the phosphine oxide compound is tris (trimethylsilyloxymethyl)phosphineoxide.

10. A lithium battery comprising:
    a cathode;
    an anode; and
    an organic electrolytic solution comprising:
      a lithium salt;
      an organic solvent comprising a first solvent having high permittivity and a second solvent having a low boiling point; and
      a phosphine oxide compound represented by Formula 1:

(1)

where l is 1, n is 0 or 1 and each of $R_1$, $R_2$, $R_3$, $R_4$, $R_5$, $R_6$, $R_7$, $R_8$, $R_9$, $R_{10}$, $R_{11}$, and $R_{12}$ is independently selected from the group consisting of C1 to C20 unsubstituted alkyl groups, C1 to C20 halogen substituted alkyl groups, C6 to C30 unsubstituted aryl groups, C6 to C30 halogen substituted aryl groups, C2 to C30 unsubstituted heteroaryl groups, and C2 to C30 halogen substituted heteroaryl groups.

11. The lithium battery of claim 10, wherein the phosphine oxide compound comprises a compound represented by Formula 2:

(2)

where m is an integer ranging from 1 to 5.

12. The lithium battery of claim 10, wherein the phosphine oxide compound is selected from the group consisting of compounds represented by Formula 3:

(3)

13. The lithium battery of claim 10, wherein the phosphine oxide compound is selected from the group consisting of compounds represented by Formula 5:

(5)

14. The lithium battery of claim 10, wherein the phosphine oxide compound is present in the organic electrolytic solution in an amount ranging from about 0.5 to about 20 wt % based on the total weight of the organic solvent.

15. The lithium battery of claim 10, wherein the phosphine oxide compound is present in the organic electrolytic solution in an amount ranging from about 1 to about 10 wt % based on the total weight of the organic solvent.

* * * * *